United States Patent
Sueishi et al.

(10) Patent No.: US 10,464,471 B2
(45) Date of Patent: Nov. 5, 2019

(54) SWITCHING DEVICE FOR VEHICLE HEADLIGHT

(71) Applicant: Mazda Motor Corporation, Aki-gun, Hiroshima (JP)

(72) Inventors: Katsuya Sueishi, Aki-gun (JP); Manabu Yamaoka, Hiroshima (JP); Tomonori Ohtsubo, Hiroshima (JP); Keiichi Sato, Hiroshima (JP); Keiichirou Yamamoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/361,539

(22) Filed: Mar. 22, 2019

(65) Prior Publication Data

US 2019/0291633 A1 Sep. 26, 2019

(30) Foreign Application Priority Data

Mar. 22, 2018 (JP) .................................. 2018-55099

(51) Int. Cl.
*B60Q 1/14* (2006.01)
*F21S 41/141* (2018.01)

(52) U.S. Cl.
CPC ......... *B60Q 1/1423* (2013.01); *B60Q 1/1476* (2013.01); *F21S 41/141* (2018.01)

(58) Field of Classification Search
CPC .... B60Q 1/1423; B60Q 1/1476; F21S 41/141
USPC ....................................................... 362/465
See application file for complete search history.

(56) References Cited

U.S. PATENT DOCUMENTS

| 5,977,494 | A | * | 11/1999 | Sano | B60K 37/06 200/61.54 |
| 6,049,171 | A | * | 4/2000 | Stam | B60Q 1/085 250/208.1 |
| 2002/0039295 | A1 | * | 4/2002 | Kobayashi | B60Q 1/12 362/465 |
| 2003/0107323 | A1 | * | 6/2003 | Stam | B60Q 1/10 315/82 |
| 2004/0055856 | A1 | * | 3/2004 | Ohashi | B60Q 1/1476 200/6 R |
| 2004/0114381 | A1 | * | 6/2004 | Salmeen | B60Q 1/085 362/465 |
| 2004/0201483 | A1 | * | 10/2004 | Stam | B60Q 1/1423 340/600 |

(Continued)

OTHER PUBLICATIONS

Mazda Roadster Instruction Manual 1st edition (Nov. 2017 Published by Mazda Co., Ltd., p. 202) [See Background for Explanation of Relevance].

*Primary Examiner* — Bryon T Gyllstrom
(74) *Attorney, Agent, or Firm* — Alleman Hall Creasman & Tuttle LLP (57) ABSTRACT

A switching device for a vehicle headlight of a vehicle having an Adaptive LED Headlight (ALH) mode. The switching device may include a steering column lever switch supported on a steering column of the vehicle so as to be movable between an initial position and a predetermined moved position by a moving operation input, an ALH switch configured to receive a switching operation input that sets the ALH mode, and a controller configured to change the irradiation mode of the headlight according to a position of the lever switch and the switching operation input received by the ALH switch.

3 Claims, 5 Drawing Sheets

(56) References Cited

U.S. PATENT DOCUMENTS

| | | | | |
|---|---|---|---|---|
| 2005/0034557 A1* | 2/2005 | Anderbrugge | ......... | B60K 37/06 |
| | | | | 74/553 |
| 2006/0177098 A1* | 8/2006 | Stam | ...................... | B60Q 1/085 |
| | | | | 382/104 |
| 2009/0010494 A1* | 1/2009 | Bechtel | ................ | B60Q 1/1423 |
| | | | | 382/104 |
| 2009/0167188 A1* | 7/2009 | Mueller | ................. | B60Q 1/085 |
| | | | | 315/82 |
| 2015/0377445 A1* | 12/2015 | Chuang | .................. | B60Q 1/143 |
| | | | | 362/465 |
| 2019/0128497 A1* | 5/2019 | Tessnow | ............. | G01M 11/068 |

* cited by examiner

SWITCHING DEVICE FOR VEHICLE HEADLIGHT

FIELD OF THE INVENTION

The present invention relates to a switching device for a headlight provided on a vehicle.

BACKGROUND ART

Non-Patent Document 1 discloses a vehicle with light emitting diode (LED) headlights, which has an Adaptive LED Headlight (ALH) mode for controlling an irradiation area of a headlight based on a detection result of a forward sensing camera.

RELATED ART

Non Patent Document 1

Mazda Roadster Instruction Manual 1st edition (November 2017 Published by Mazda Co., Ltd., Page. 202)

SUMMARY OF THE INVENTION

Problems to be Solved by the Invention

For a conventional vehicle, in order to switch from a low beam mode to an ALH mode, it is necessary to switch a lamp switch to an AUTO position and further to move a lever switch, that is, a steering column lever switch mounted to a steering column of a vehicle, from a low beam position to a high beam position.

An object of the present invention is to provide a switching device for a vehicle headlight capable of improving a user's convenience on a vehicle having an ALH mode.

BRIEF SUMMARY OF THE INVENTION

The present invention, according to a first aspect, is a switching device for a vehicle headlight having a low beam mode for irradiating a short distance area of the vehicle, a high beam mode for irradiating a long distance area of the vehicle, and an ALH mode for irradiating an area that is set based on a detection result of a predetermined detection device as irradiating modes for the headlight. The switching device may include a steering column lever switch supported on a steering column of the vehicle so as to be movable between an initial position and a predetermined moved position by a moving operation input, an ALH switch configured to receive a switching operation input that sets the ALH mode, and a controller configured to change the irradiation mode of the headlight according to a position of the lever switch and the switching operation input received by the ALH switch. When the lever switch is in the initial position and the irradiation mode is set to the low beam mode, and the switching operation input on the ALH switch is received, the controller changes the irradiation mode to the ALH mode. When the lever switch is in the initial position and the irradiation mode is set to the ALH mode, and the switching operation input on the ALH switch is received, the controller changes the irradiation mode to the low beam mode. When the lever switch is in the predetermined moved position, the controller sets the irradiation mode to the high beam mode. Further, when the lever switch is in the predetermined moved position and the irradiation mode is set to the high beam mode, and the switching operation input on the ALH switch is received, the controller changes the irradiation mode to the ALH mode and also moves the lever switch to the initial position.

According to a second aspect, when the lever switch is in the initial position and the irradiation mode is set to the ALH mode, and the moving operation input is performed on the lever switch to move the lever to a predetermined moved position, the controller changes the irradiation mode to the high beam mode.

According to a third aspect, when the lever switch is in the predetermined moved position and the irradiation mode is set to the high beam mode, and the moving operation input is received on the lever switch to move the lever switch to the initial position, the controller changes the irradiation mode to the low beam mode.

Effects of the Invention

According to the first aspect above, even when the current irradiation mode is in either the low beam or the high beam mode, the mode can be switched to the ALH mode only by performing a single switching operation on the ALH switch. Therefore, the convenience of the user can be improved with the vehicle having the ALH mode. In particular, when the ALH mode is set, since the lever switch is always located at the initial position, the user can easily recognize that the mode is set to the ALH mode.

According to the second aspect, the change from the ALH mode to the high beam mode can be operated intuitively.

According to the third aspect, the change from the high beam mode to the low beam mode can be operated intuitively.

DETAILED DESCRIPTION OF THE EMBODIMENTS

Hereinafter, a switching device for a vehicle headlight according to an embodiment of the present invention will be described.

1. Configuration

Figure 1:
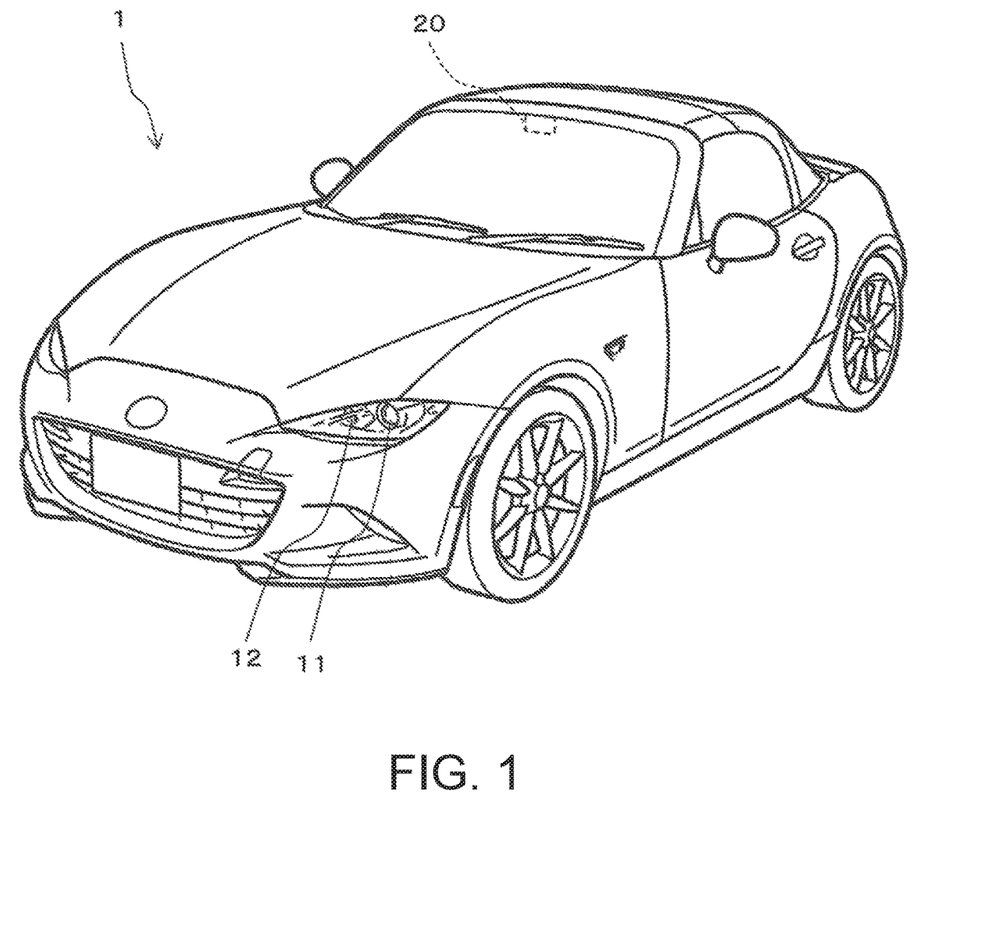
FIG. 1 is an outline drawing of a vehicle having a switching device for a vehicle headlight according to a first embodiment of the present invention.

FIG. 1 is an outline drawing of a vehicle having a switching device for a vehicle headlight according to a first embodiment of the present invention.

A vehicle 1 is a vehicle having four wheels driven by an engine and a transmission, and a headlight 11 and a parking light (also referred to as a "sidelight") 12 are provided on the left and right of a front part of the vehicle 1.

Headlight 11 includes an LED (Light Emitting Diode) light divided into a plurality of blocks each having an LED positioned therein. The LED can be turned on/off for each block.

The vehicle 1 includes, as irradiation modes of the headlight 11, a low beam mode for irradiating a short distance area of the vehicle 1 with a low beam, a high beam mode for irradiating a long distance area of the vehicle 1 with a high beam, and an ALH (Adaptive LED Headlight) mode for generating and irradiating a beam corresponding to the area set based on a detection result of a forward sensing camera 20. In the ALH mode, the distribution of light emitted by the headlights is changed, for example in pattern and intensity, by controllably varying the pattern and intensity of the individual LEDs which are lighted up, based upon the travelling conditions in the environment surrounding, and particularly forward of, the vehicle. ALH mode is sometimes referred to as adaptive high beam control, adaptive driving headlights, etc. in other contexts.

As used herein the term "short distance area" refers to an area, as viewed from above, on the plane on which the vehicle is positioned that is illuminated by the headlights in the low beam mode, while "long distance area" refers to an area, as viewed from above, on the plane on which the vehicle is positioned that is illuminated by the headlights in the high beam mode. The short distance of the short distance mode and long distance of the long distance mode are measured from a front of the vehicle itself to a furthest point of each respective the illuminated area in front of the vehicle in each mode. It will be appreciated that the short distance is shorter than the long distance, since the headlights in the high beam mode project further than in the low beam mode. Switching of the irradiation mode of the headlight 11 is controlled by a controller 100 according to a user's operation with respect to various switches and the like which will be described later. It will be appreciated that controller 100 typically includes a microprocessor with associated non-volatile memory that store programs configured to execute the functions described herein using portions of volatile memory. The microprocessor may be an application specific integrated circuit (ASIC), a central processing unit (CPU), or other suitable form of processor.

The forward sensing camera 20 is an example of a predetermined detection device and is provided on an upper indoor side of a windshield. The forward sensing camera 20 captures a moving image and outputs it to the controller 100.

In the ALH mode, the irradiation area of the headlight 11 is automatically changed based on the detection result of the forward sensing camera 20. For example, based on the detection result of the forward sensing camera 20, a short distance area of the vehicle 1 is irradiated similarly to the low beam mode, a long distance area of the vehicle 1 is irradiated similarly to the high beam mode, illumination is reduced to a part of the long distance area when high beams are on, or the irradiation area when low beams are on is enlarged in the vehicle width direction. The irradiation area of the headlight 11 can be controlled, for example, by controlling the turning on and/or off the LEDs of the headlight 11 for each block.

Figure 2:
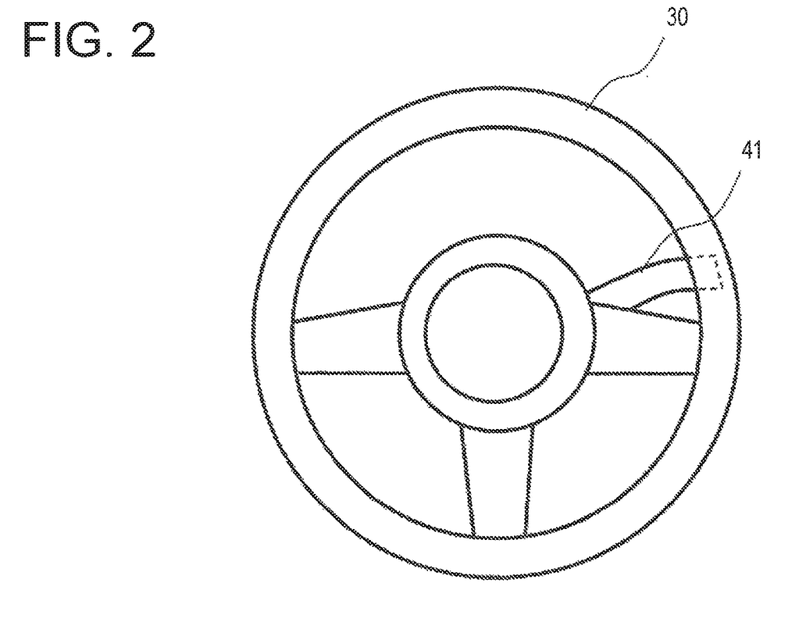
FIG. 2 is a drawing schematically showing an appearance of a steering wheel part.

FIG. 2 is a drawing schematically showing an appearance of a steering wheel part.

A steering column lever switch 41 (also referred herein as "lever switch") is arranged in front of a steering wheel 30 provided in the passenger compartment.

Figure 3:
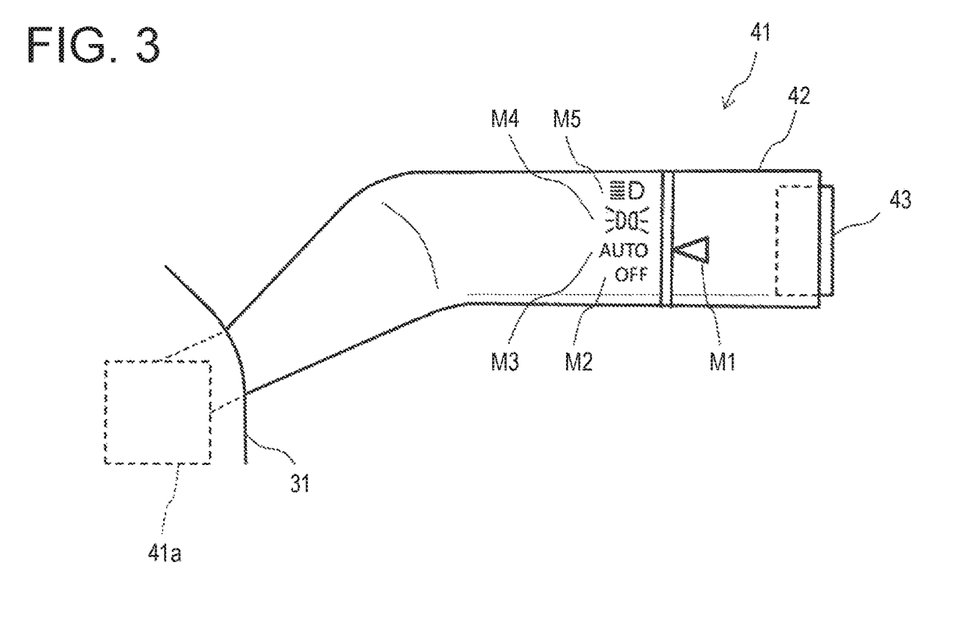
FIG. 3 is an outline drawing of a steering column lever switch.

FIG. 3 is an outline drawing of the lever switch 41.

The lever switch 41 has a lever shape and is supported by a supporting part 41a provided on a base 31 of a steering device at one end. The lever switch 41 is supported on the steering column of the vehicle so as to be movable between an initial position and a predetermined moved position by a moving operation input, such as movement by the hand of a user, as described below.

Figure 4:
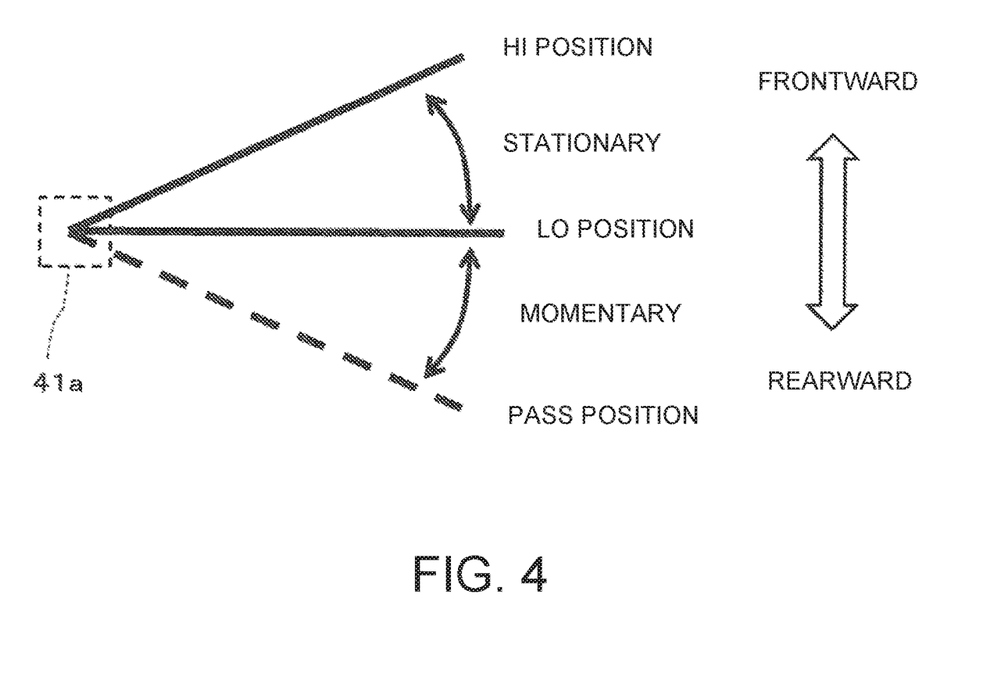
FIG. 4 is a diagram illustrating movements of a steering column lever switch.

FIG. 4 is a diagram illustrating movements of the lever switch 41.

The lever switch 41 is supported by the supporting part 41a so as to be movable (for example, in a swingable fashion) in a longitudinal direction of the vehicle about the one end side. It will be noted that the lever switch 41 is movable into and out of the page in FIG. 3, which corresponds to towards the top and bottom of the page in FIG. 4, as shown. Specifically, the supporting part 41a supports the lever switch 41 movably between a Hi position and a Pass position across a Lo position. The Lo position is an example of an initial position, and the Hi position is an example of a predetermined moved position. When the lever switch 41 is moved to the Lo position by a user operation, the supporting part 41a holds the lever switch 41 at the Lo position. Moreover, when the lever switch 41 is moved to the Hi position by the user operation, the supporting part 41a holds the lever switch 41 at the Hi position. Further, when the lever switch 41 is moved to the Pass position by the user operation, the supporting part 41a moves the lever switch 41 to the Lo position without holding it at the Pass position. That is, the movement of the lever switch 41 between the Hi position and the Lo position is stationary and the movement from the Lo position to the Pass position is momentary. The supporting part 41a may perform the above described hold by only a mechanical part (i.e., a mechanism) or may perform the above described hold by the mechanical part and an electric part such as a motor (i.e., an electromechanical system).

When the lever switch 41 is in the Hi position, the Lo position, or the Pass position, the supporting part 41a performs not only the supporting function but also forms a circuit corresponding to each. According to this, the controller 100 can detect the current position of the lever switch 41.

Returning to FIG. 3, a lamp switch 42 is provided on a tip end side of the lever switch 41. The lamp switch 42 is rotatable about the longitudinal direction of the lever, and a triangular selection mark M1 is provided thereon. When the lamp switch 42 is rotated to set the selection mark M1 to an OFF mark M2, an AUTO mark M3, a parking light mark M4, and a head lamp mark M5, a circuit corresponding to each is formed. According to this, the controller 100 can detect the current position of the lamp switch 42. Moreover, hereinafter, when the selection mark M1 of the lamp switch 42 is set to the OFF mark M2, the AUTO mark M3, the parking light mark M4, or the head lamp mark M5, it indicates that the lamp switch 42 is in the OFF position, the AUTO position, the parking light position, or the head lamp position.

An ALH switch 43 is provided on the tip end surface of the lever switch 41. The ALH switch 43 may be a push button type switch that can be pushed-in along a longitudinal axis direction of the lever (i.e., toward the steering column). The ALH switch 43 is energized in a direction projecting from the tip end surface in the long axis direction of the lever. According to this, after the ALH switch 43 is pushed with a finger at a reference position shown in FIG. 3, when the finger is released, it returns to the reference position. While the ALH switch 43 is pushed in, an ON circuit is formed. According to this, the controller 100 can detect that a push-in operation was performed to the ALH switch 43.

Figure 5:
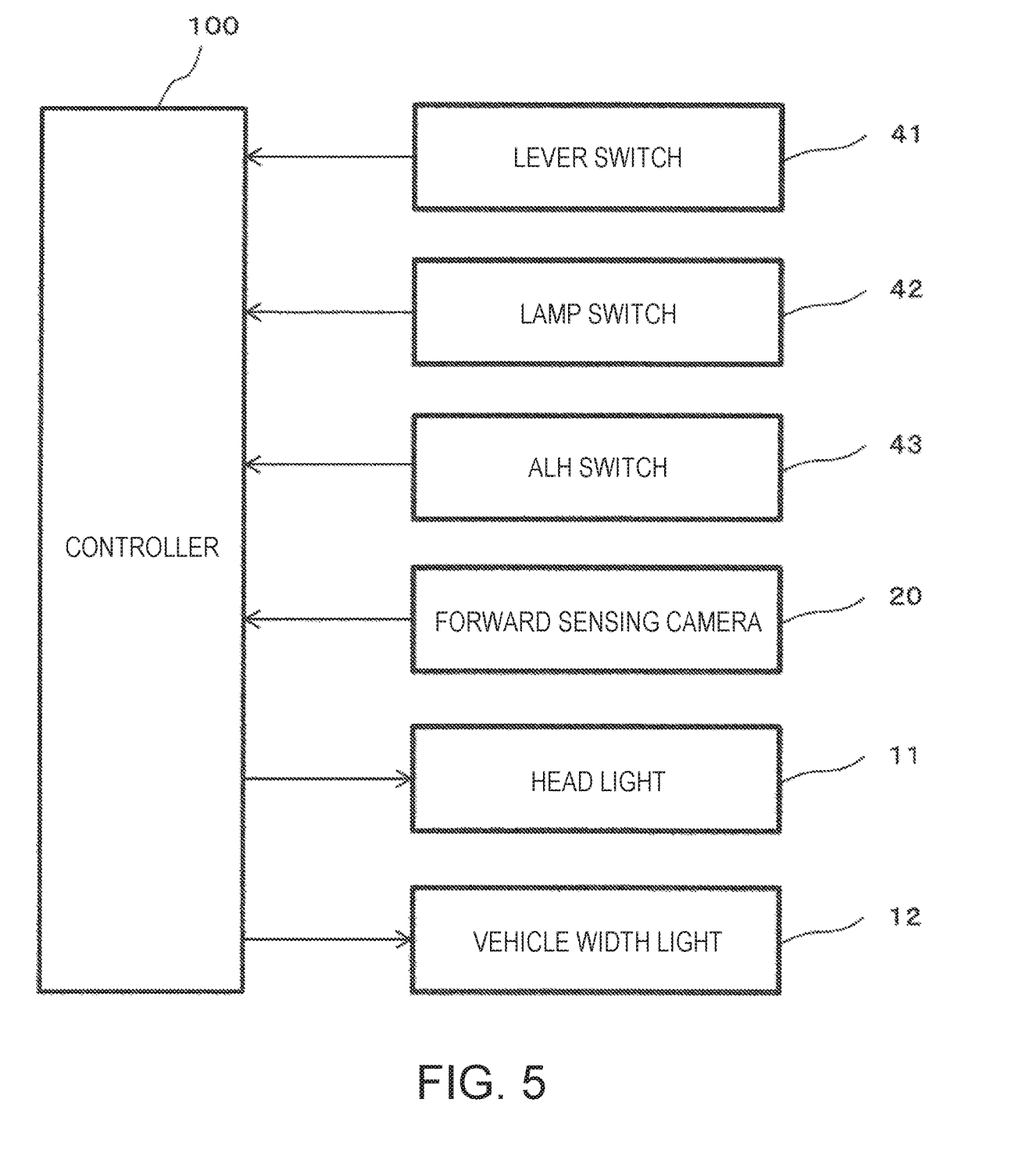
FIG. 5 is a diagram showing a control system.

FIG. 5 is a diagram showing a control system.

As discussed above, vehicle 1 includes the controller 100 that controls an irradiation state of the headlight 11. The lever switch 41, the lamp switch 42, the ALH switch 43, the forward sensing camera 20, the headlight 11, and the parking light 12 are electrically connected to the controller 100. The controller 100 detects the positions of the lever switch 41, the lamp switch 42, and the ALH switch 43 and also receives as inputs the moving images captured by the forward sensing camera 20. Then, the controller 100 controls the irradiation of the headlight 11 based on the detected positions of the respective switches and the moving images captured by the forward sensing camera 20. The irradiation states of the headlight 11 and the parking light 12 are different depending on whether the power switch of the vehicle 1 is in the ON position, the OFF position, or the ACC position, however it is assumed that the power switch is in the ON position in the following description.

Specifically, when the lamp switch 42 is in the OFF position, the controller 100 turns on neither the headlight 11 or the parking light 12.

When the lamp switch 42 is in the AUTO position, the controller 100 automatically turns on/off the headlight 11 and the parking light 12 according to the illuminance detected by an illuminance sensor (not shown). Moreover, when it is in the AUTO position, the ON/OFF state of the ALH function is controlled according to the position of the lever switch 41 and the position of the ALH switch 43.

The controller 100 turns on the parking light 12 when the lamp switch 42 is in the parking light position.

When the lamp switch 42 is in the headlight position, the controller 100 turns on the headlight 11 and the parking light 12.

Figure 6:
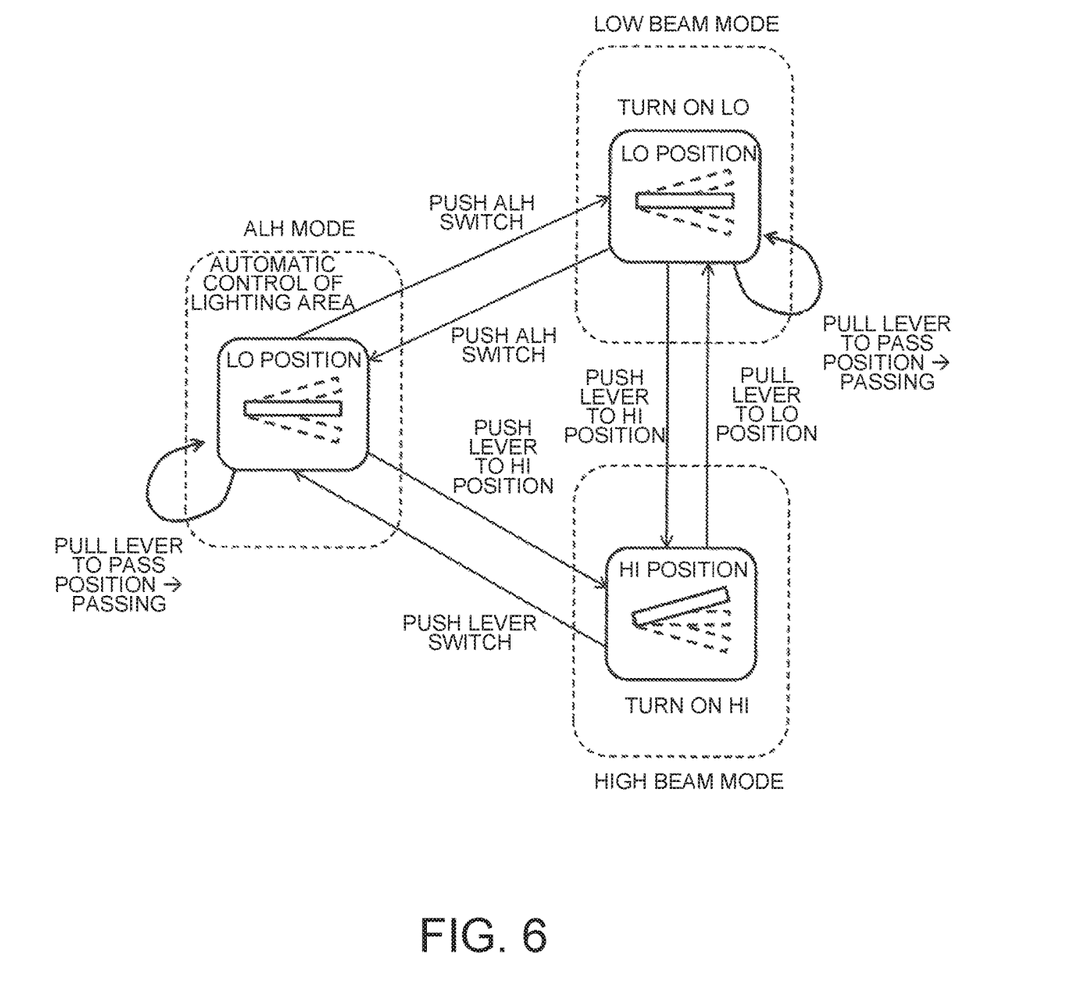
FIG. 6 is a diagram illustrating irradiation controls of a headlight by a controller.

FIG. 6 is a diagram illustrating irradiation control of the headlight 11 by the controller 100.

When the lamp switch 42 is in the AUTO position, the controller 100 controls the irradiation of the headlight 11 as shown in FIG. 6 according to the position of the lever switch 41 and the position of the ALH switch 43.

That is, when the lever switch 41 is in the Lo position and the irradiation mode is set to the low beam mode, if the operation to push the lever switch 41 to the Hi position is performed, the controller 100 sets the irradiation mode to the high beam mode.

When the lever switch 41 is in the Hi position and the irradiation mode is set to the high beam mode, if the operation to pull the lever switch 41 to the Lo position is performed, the controller 100 changes the irradiation mode to the low beam mode.

When the lever switch 41 is in the Lo position and the irradiation mode is set to the low beam mode, if the push-in operation to the ALH switch 43 is performed, the controller 100 changes the irradiation mode to the ALH mode.

When the lever switch 41 is in the Lo position and the irradiation mode is set to the ALH mode, if the push-in operation to the ALH switch 43 is performed, the controller 100 changes the irradiation mode to the low beam mode.

When the lever switch 41 is in the Hi position and the irradiation mode is set to the high beam mode, if the push-in operation to the ALH switch 43 is performed, the controller 100 changes the irradiation mode to the ALH mode and also moves the lever switch 41 to the Lo position.

When the lever switch 41 is in the Lo position and the irradiation mode is set to the ALH mode, if the operation to push the lever switch 41 to the Hi position is performed, the controller 100 changes the irradiation mode to the high beam mode.

When the lever switch 41 is in the low position and the irradiation mode is set to the low beam mode or the ALH mode, if the operation to pull the lever switch 41 to the Pass position is performed, the controller 100 performs a passing irradiation. Since the lever switch 41 is energized to the Lo position side, when the user's hand is released, it automatically returns to the Lo position.

2. Operation

According to the present embodiment, if the push-in operation to the ALH switch 43 is performed once while the current irradiation mode is in the low beam or high beam mode, it is switched to the ALH mode. According to this, even when the current irradiation mode is in either the low beam mode or the high beam mode, it can be switched to the ALH mode only by performing the push-in operation to the ALH switch 43 once. Therefore, the convenience for the user of the vehicle 1 having the ALH mode can be improved. In particular, when the ALH mode is set, since the lever switch 41 is always located at the Lo position, the user can easily recognize that the mode is set to the ALH mode. Therefore, also on this point, the convenience for the user can be improved.

Moreover, according to the present embodiment, when the operation to push the lever switch 41 to the Hi position is performed while the irradiation mode is set to the ALH mode, the irradiation mode is changed to the high beam mode. Therefore, the change from the ALH mode to the high beam mode can be performed intuitively by a single operation.

Further, the change from the high beam mode to the low beam mode can be performed by a single operation to the lever switch 41 similar to a conventional case.

Moreover, by adopting the above described configuration, as is clearly shown in FIG. 6, since it is possible to change from the ALH mode to the low beam mode or to the high beam mode by a single operation respectively, the Lo position of the ALH mode can be used as a standard position.

Modifications of the Embodiment 1

In the embodiment 1, when the lamp switch 42 is in the AUTO position, the switching control of the irradiation mode described in FIG. 6 is performed. However, even when the lamp switch 42 is in the headlight position, the switching control of the irradiation mode can be also performed similar to that described in FIG. 6.

Summary of Embodiments

The switching device for the vehicle headlight of the present embodiment described above has the following configurations and features.

Therefore, the switching device for a vehicle headlight of the present embodiment having a low beam mode for irradiating a short distance area of a vehicle 1, a high beam mode for irradiating a long distance area of the vehicle 1, an ALH mode for irradiating an area set based on a detection result of a predetermined detection device, as irradiating modes for a headlight 11, comprises a lever switch 41 movably supported in a Lo position (an initial position) and a Hi position (a predetermined moved position), an ALH switch 43 for accepting a push-in operation (a switching operation) of setting of the ALH mode, and a controller 100 for changing an irradiation mode of the headlight 11 according to an operation (moving operation input) of the lever switch 41 and an operation (switching operation input) of the ALH switch 43.

When the lever switch 41 is in the Lo position (the initial position) and the irradiation mode is set to the low beam mode, if the push-in operation (the switching operation) to the ALH switch 43 is performed, the controller 100 changes the irradiation mode to the ALH mode. When the lever switch 41 is in the Lo position (the initial position) and the irradiation mode is set to the ALH mode, if the push-in operation (the switching operation) to the ALH switch 43 is performed, the controller 100 changes the irradiation mode to the low beam mode. When the lever switch 41 is in the Hi position (the predetermined moved position), the controller 100 sets the high beam mode. Further, when the lever switch 41 is in the Hi position (the predetermined moved position) and the irradiation mode is set to the high beam mode, if the push-in operation (the switching operation input) to the ALH switch 43 is performed, the controller 100 changes the irradiation mode to the ALH mode and also moves the lever switch 41 to the Lo position (the initial position).

According to this configuration, convenience for the user of the vehicle 1 having the ALH mode can be improved.

Moreover, on the switching device for the vehicle headlight according to the present embodiment, when the lever switch 41 is in the Lo position (the initial position) and the irradiation mode is set to the ALH mode, if the operation to push the lever switch 41 to the Hi position (the moving operation to the predetermined moving position) is performed, the controller 100 changes the irradiation mode to the high beam mode.

According to this, the change from the ALH mode to the high beam mode can be operated intuitively.

Moreover, on the switching device for the vehicle headlight according to the present embodiment, when the lever switch 41 is in the Hi position (the predetermined moving position) and the irradiation mode is set to the high beam mode, if the operation to pull the lever switch 41 to the Lo position (the moving operation to the initial position) performed, the controller 100 changes the irradiation mode to the low beam mode.

According to this, the change from the high beam mode to the low beam mode can be operated intuitively.

INDUSTRIAL APPLICABILITY

The switching device of the vehicle headlight of the present invention can be widely used for a vehicle having a vehicle headlight.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

EXPLANATION OF REFERENCE CHARACTERS

1 Vehicle
11 Headlight
12 Parking light (sidelight)
20 Forward sensing camera
30 Steering wheels
31 Base
41 Lever switch
42 Lamp switch
43 ALH switch
100 Controller

We claim:

1. A switching device for a vehicle headlight having a low beam mode for irradiating a short distance area of a vehicle, a high beam mode for irradiating a long distance area of the vehicle, an Adaptive LED Headlight (ALH) mode for irradiating an area that is set based on a detection result of a detection device as irradiating modes for the vehicle headlight, the switching device comprising:
   a steering column lever switch supported on a steering column of the vehicle so as to be movable between an initial position and a predetermined moved position by a moving operation input,
   an ALH switch configured to receive a switching operation input that sets the ALH mode, and
   a controller configured to change the irradiation mode of the headlight according to a position of the lever switch and the switching operation input received by the ALH switch,
   wherein when the lever switch is in the initial position and the irradiation mode is set to the low beam mode, and the switching operation input on the ALH switch is received, the controller changes the irradiation mode to the ALH mode,
   wherein when the lever switch is in the initial position and the irradiation mode is set to the ALH mode, and the switching operation input on the ALH switch is received, the controller changes the irradiation mode to the low beam mode,
   wherein when the lever switch is in the predetermined moved position, the controller sets the irradiation mode to the high beam mode, and
   wherein when the switch is in the predetermined moved position and the irradiation mode is set to the high beam mode, and the switching operation input on the ALH switch is received, the controller changes the irradiation mode to the ALH mode and also moves the lever switch to the initial position.

2. The switching device for the vehicle headlight according to claim 1,
   wherein when the lever switch is in the initial position and the irradiation mode is set to the ALH mode, and the moving operation input is performed on the lever switch to move the lever switch to the predetermined moved position, the controller changes the irradiation mode to the high beam mode.

3. The switching device for the vehicle headlight according to claim 1,
   wherein when the lever switch is in the predetermined moved position and the irradiation mode is set to the high beam mode, and the moving operation input is performed on the lever switch to move the lever switch to the initial position, the controller changes the irradiation mode to the low beam mode.

* * * * *